United States Patent
Cardarelli (12) 
(10) Patent No.: US 6,725,719 B2
(45) Date of Patent: Apr. 27, 2004

(54) MEMS-INTEGRATED INERTIAL MEASUREMENT UNITS ON A COMMON SUBSTRATE

(75) Inventor: Donato Cardarelli, Medford, MA (US)

(73) Assignee: Milli Sensor Systems and Actuators, Inc., West Newton, MA (US)

(*) Notice: Subject to any disclaimer, the term of this patent is extended or adjusted under 35 U.S.C. 154(b) by 0 days.

(21) Appl. No.: 10/417,818

(22) Filed: Apr. 17, 2003

(65) Prior Publication Data

US 2003/0196490 A1 Oct. 23, 2003

Related U.S. Application Data

(60) Provisional application No. 60/373,253, filed on Apr. 17, 2002.

(51) Int. Cl.[7] .............................................. G01C 19/00
(52) U.S. Cl. .................................................. 73/504.04
(58) Field of Search ........................ 73/504.02, 504.03, 73/504.04

(56) References Cited

U.S. PATENT DOCUMENTS 5,396,797 A * 3/1995 Hulsing, II .............. 73/504.04
6,463,802 B2 * 10/2002 Hulsing, II .............. 73/504.04

* cited by examiner

Primary Examiner—Richard A. Moller
(74) Attorney, Agent, or Firm—Brian M. Dingman, Esq.; Mirick, O'Connell, DeMallie & Lougee, LLP (57) ABSTRACT

MEMS-Integrated IMUs are possible based on a common substrate that provides a common oscillatory drive for the operation of the gyroscopes and accelerometers. The common substrate becomes the stable member utilized in conventional IMUs. The advantages of the embodiments are smallest size, flexibility in how IMUs are configured, reduced electronics and a single package. MEMS integration also reduces uncertainties due to separately developed instruments based on different fabrication processes, materials, assembly and alignment.

22 Claims, 9 Drawing Sheets

MEMS-INTEGRATED INERTIAL MEASUREMENT UNITS ON A COMMON SUBSTRATE

CROSS REFERENCE TO RELATED APPLICATION

This application claims priority of Provisional application serial No. 60/373,253, filed on Apr. 17, 2002.

FIELD OF THE INVENTION

This invention relates to the simplification, size reduction and cost reduction of Inertial Measurement Units (IMUs)

SUMMARY OF THE INVENTION

Inertial Measurement Units (IMUs) measure the motion of a body in six degrees of freedom using a set of gyroscopes and accelerometers. A typical IMU comprises three gyroscopes and three accelerometers, each a single degree of freedom instrument. They are aligned with respect to three orthogonal axes. They are assembled onto a common member that is sometimes referred to as a "stable member" because it retains the relative alignment and positions of the instruments and, in gimballed guidance and navigation systems applications, it is held aligned to an inertial reference. Typically the instruments are self contained units with their own packages and electronics. And, usually they are representative of different designs, fabrication technologies and materials. IMUs are complex, large and expensive.

This invention relates to the simplification, size reduction and cost reduction of IMUs through MEMS integration. MEMS (Microelectromechanical Systems) is the technology for fabrication and the basis for planar design and design methodologies. MEMS enables the batch fabrication of devices in large quantities to reduce cost. As the technology matures, MEMS will also enable the fabrication of devices having predictable functionality and uniformity. Perhaps not as well appreciated is that MEMS integrates parts into a completed entity. Further assembly and alignment is not required. The advantage of integration is that the uncertainty that normally accompanies the design and fabrication and assembly of separate parts based on dimensioning and tolerancing is reduced.

This invention relates to the exploitation of MEMS integration to design IMUs that take full advantage of integration and to fabricate the full IMU on a common substrate, a chip.

This invention relates to planar gyroscope and accelerometer designs that can be arranged on a chip to sense all degrees of freedom necessary for an application that can be fabricated by the same process.

This invention relates to instrument designs based on a common structure to simplify design and fabrication.

This invention relates to instrument designs that share a common, mechanical structure to provide the same function for each instrument. The increased level of integration reduces the number of parts in the IMU. The common function is a mechanical oscillation.

This invention relates to IMU designs for which one common, mechanical structure provides the same function (mechanical oscillation) for all the instruments. This represents a limit to the reduction in number of overall parts in the IMU and enables the smallest attainable size.

The common mechanical structure becomes the common substrate for all the instruments and can be related to the "stable member" of traditional IMUs, although it is driven in mechanical oscillation.

The main advantage of full integration is the elimination of uncertainty that accompanies the assembly and alignment of separate instruments onto a common member.

A second advantage is the reduction in electronics required to drive each instrument since one set of drive electronics will suffice.

Other advantages include the use of common instrument designs, of a common process being applied to all at the same time, construction based on common materials and a single package. These factors should contribute to a high degree of correlation between the instruments that can be exploited to improve IMU performance.

Generally an Inertial Measurement Unit (IMU) can contain any number of gyroscopes and accelerometers. The typical IMU is a six degree-of-freedom (DOF) design containing three single DOF gyroscopes and three single DOF accelerometers. However some applications do not require the measurement of six degrees of freedom and therefore a lower number of instruments will suffice. It is also true in the case of the six DOF IMU, that more than three gyroscopes and three accelerometers can be used. That is because integration allows the configuration of more sophisticated designs whereby additional instruments are added to build-in redundancy or to operate sets of instruments differentially (with pairs of instruments) to remove common mode errors, etc. Various combinations of gyroscopes and accelerometers will occur to those skilled in the art of IMU design.

Several Considerations apply that drive the MEMS-Integrated IMU design:

Consideration 1 —MEMS integration is a means to achieve optimum performance in a miniature IMU.

Consideration 2—MEMS gyroscopes and accelerometers based on a common structure reduce the requirements on fabrication processes thereby improving yield without which an Integrated IMU is not possible.

Consideration 3—MEMS gyroscopes and accelerometers based on the common structure simplify the IMU design.

Consideration 4—Standard gyroscope and accelerometer designs form the basis for designing various IMUs.

Consideration 5—An integrated IMU makes the most efficient use of space resulting in the smallest size.

Consideration 6—An integrated IMU requires one package that provides a common environment for all instruments.

BRIEF DESCRIPTION OF THE DRAWINGS

Other objects, features and advantages will occur to those skilled in the art from the following descriptions of the preferred embodiments, and the accompanying drawings, in which.

DESCRIPTION OF THE PREFERRED EMBODIMENTS OF THE INVENTION

The invention incorporates gyroscope and accelerometer instruments on a common substrate to form a MEMS-integrated IMU. The instruments benefit from a common mechanical oscillation that is provided by the common substrate (also termed a common gimbal). For planar instruments, there are two mechanical oscillations possible: about an axis in the plane and about an axis normal to the plane. For each of these motions, there are candidate planar gyroscopes and accelerometers that are applicable. Each of these inertial measurement instruments comprises a responsive member that is coupled to the planar gimbal by flexures.

MEMS gyroscopes and accelerometers are planar devices comprised of members that are flexurally connected to each other and the assembly to the case. Gyroscopes generally require two moving members. One member is driven into oscillation and the second member reacts to rotation rate by oscillating at the same frequency as the driven member at an amplitude that is proportional to input amplitude. Simple flexured accelerometers are either proof mass or pendulous devices that require one moving member. Tuned Flexure Accelerometers (TFA) (U.S. Pat. No. 6,338,274 B1) add a gimbal to the simple designs that is used to dynamically tune the mechanical response. The TFA requires two moving members. In this invention the greater benefit is realized for IMUs based on the larger number of two-member instruments. The simple accelerometers do not require the drive oscillation but can be included on the common member without degradation to their performance.

To illustrate IMUs embodiments, some candidate gyroscopes and accelerometers are first identified. Others are possible. This list comprises one set of candidates.

Candidate Gyroscopes

Figure 1A:
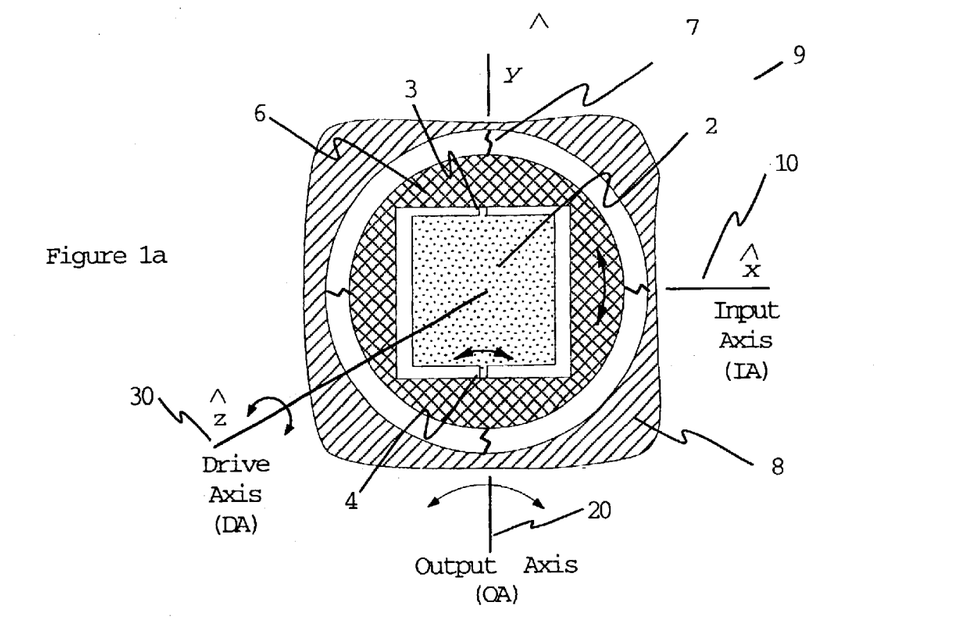
FIG. 1a depicts an embodiment of a planar gyroscope with a drive (outer) member that is oscillated about an axis that is normal to the plane and a responsive member that senses rotation rate about an axis in the plane.

In FIG. 1a is shown a first planar gyroscope 9 capable of sensing rotation rate about the Input Axis (IA) 10 which lies in the plane (x-axis in this case). The gyro comprises an Inner Member 2 attached with torsional flexures 3,4 to the Outer Member 6 which is flexurally attached with radial flexures 7 (four shown) to the Case 8. To operate the gyro, the Outer Member is mechanically oscillated in the plane about the Drive Axis (DA) 30, which is normal to the plane. As the Outer Member is oscillated, so is the Inner Member due to the high stiffness of the torsional flexures 3, 4 to this motion. The oscillatory drive motion is kept constant to maintain constant gyro sensitivity. The frequency of oscillation is typically locked to the mechanical resonance of the Outer Member to minimize drive power. As the case experiences a rotation rate about the Input Axis, the Inner Member oscillates about the Output Axis 20 at the same frequency as the Outer Member at an amplitude that is proportional to input. This gyro is appropriate for the IMU of this invention based on a common drive member that oscillates about the axis normal to the plane since the Outer Member oscillates about this axis.

Figure 1B:
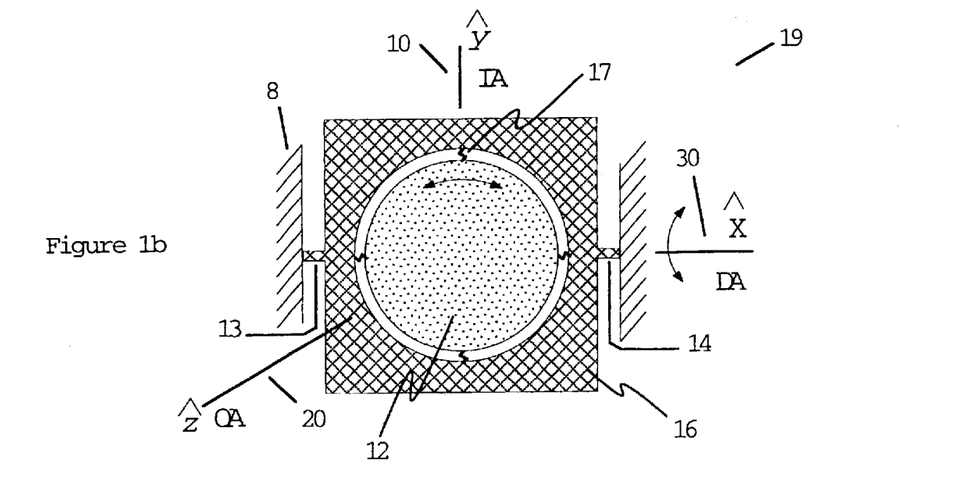
FIG. 1b depicts an embodiment of a planar gyroscope with a drive (outer) member that is oscillated about an axis in the plane and a responsive member that senses rotation rate about an axis in the plane.

In FIG. 1b is shown a second planar gyroscope 19 capable of sensing rotation rate about the Input Axis (IA) 10 which lies in the plane (y-axis in this case). The gyro comprises an Inner Member 12 attached with radial flexures 17 (four are shown) to the Outer Member 16, which is flexurally attached with torsional flexures 13, 14 to the Case 8. To operate the gyro, the Outer Member is oscillated about the Drive Axis 30, an axis in the plane. As the Outer Member is oscillated, so is the Inner Member due to the high stiffness of the radial flexures 17 to this motion. The oscillatory drive motion is kept constant to maintain constant gyro sensitivity, and the frequency of oscillation is locked to the mechanical resonance of the Outer Member to minimize drive power. As the case experiences rotation rate about the Input Axis 10, the Inner Member oscillates about the Output Axis 20 at the same frequency as the Outer Member at an amplitude proportional to input. This gyro is appropriate for the IMU of this invention based on a common drive member that oscillates about an axis that lies in the plane.

Z-Gyroscope

Figure 1C:
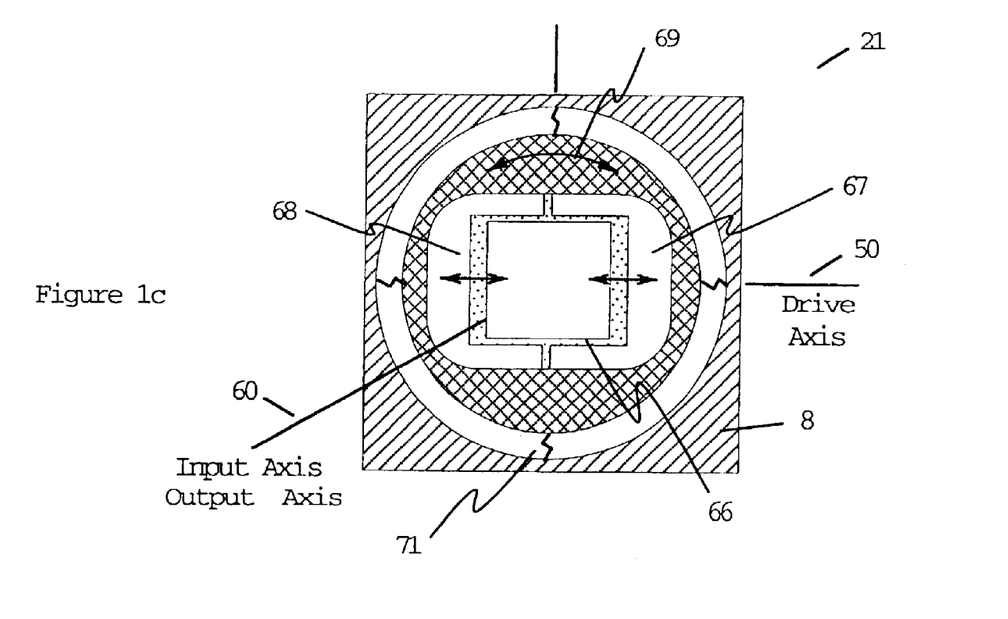
FIG. 1c depicts an embodiment of a planar gyroscope with a drive member consisting of a double ended tuning fork (DETF) with tines that are oscillated along an axis in the plane and a responsive member that senses rotation rate about the axis normal to the plane.

In FIG. 1c is shown the z-gyroscope (U.S. Pat. No. 6,481,283 B 1) 21. Unlike the gyroscopes of FIGS. 1a and 1b, that are based on members that oscillate rotationally about axes, the z-gyro is based on a double-ended tuning fork 66 (DETF) for the Inner Member that is rigidly attached to the Outer Member 69. Any force acting on the DETF to cause rotation of the DETF about the axis normal to the plane will be transferred to the Outer Member to allow the rotary motion. The Outer Member is attached with radial flexures 71 (four shown) to the Case 8. During operation the tines 67, 68 of the DETF are driven to oscillate linearly in the plane and in opposition to each other along the Drive Axis 50. As a result of Case rotation about the Input Axis 60, a force acts on each tine in a direction in the plane and orthogonal to the tine motion. Since the tines, oscillate in opposition, the forces on the separate tines act in opposite directions; the net effect of the forces is to torque the DETF and cause oscillation of the Outer Member at the tine oscillation frequency with an amplitude proportional to input. Note that the Outer Member motion is rotational and about the Output Axis 60 that is also the Input Axis.

Candidate Tuned Flexure Accelerometers

Accelerometers use a reference mass that is somehow supported within a housing (case) that is attached to the body whose motion is to be measured. With acceleration of the body, the housing moves relative to the reference mass. Relative to the housing (case), the motion of the reference mass is measured with a pick-off. For open loop accelerometers, the pick-off signal is proportional to acceleration and can be calibrated using known input accelerations. For closed loop accelerometers, the pick-off signal is fed to a control loop whose output drives an actuator which is used to force the reference mass back to a reference position. The actuator input is then proportional to the acceleration and can be calibrated with known input accelerations.

The tuned flexure accelerometer (TFA) is a subset of flexured accelerometers in general; many TFA embodiments can readily be fabricated with MEMS (MicroElectroMechanical Systems) technology. A limit to the performance of all flexure supported reference mass accelerometers is bias instability due to the finite flexure elastic restraint (or spring stiffness) and pick-off instability. The Tuned Flexure Accelerometer described in U.S. Pat. No. 6,338,274 B1 reduces this error through dynamic means to develop a net flexure stiffness that can be reduced or even adjusted to zero without compromising flexure strength.

There are two general types of accelerometers, linear and pendulous. This description is applicable to both types, for which flexures provide restraint of the reference mass or pendulum. In the linear type, the reference mass moves translationally relative to the housing (case). In the pendulous type, the reference mass may be attached to a member (often termed the "moment arm") and the combination supported and constrained to rotate about an axis of rotation defined by flexures.

Additionally, by dynamically tuning the effective stiffness of the flexures to zero, the condition of a "free mass" may be achieved. Closed loop operation is necessary in this case and a force or torque actuator is used to balance the acceleration-produced force or torque. With the addition of damping of the reference mass motion, the instrument can accurately measure velocity change directly. In the case of momentary power outage, the pendulum stores the velocity change with deflection. The velocity is subsequently recovered with loop closure.

TFA accelerometers address a problem in flexured devices, that soft (i.e., very flexible) flexures are needed to increase the sensitivity of the accelerometer, while stiff (i.e., very inflexible) flexures are required to provide ruggedness and to constrain the other five degrees of freedom, to prevent motions that may degrade the performance or survivability of the accelerometer. These conflicting requirements cannot both be satisfied simultaneously. This is a perennial limitation of accelerometers utilizing flexure suspended reference masses.

Dynamic tuning is better understood from the equation of motion after the rotational sensitivities are removed. The simpler equation of motion becomes $$I_{So}\ddot{\delta}+D_{S}\dot{\delta}+[K_{S}+\phi^{2}\Delta I_{S}]\delta=\tau_{p}-\tau_{rebalance} \quad (1)$$

The bracketed term contains the sum of the flexure stiffness and the dynamic stiffness. The dynamic stiffness is given by $$K_D = \dot{\phi}^2 \Delta I_s = \frac{1}{2}\Delta I_s \omega^2 \bar{\phi}^2 \quad (2)$$

By oscillating the Inner Sense Member by driving the Outer Member with an amplitude φ and frequency ω and by setting the Inner Member inertia by design to obtain $\Delta I_s = I_i - I_s < 0$ (less than zero), a negative dynamic stiffness is obtained that can cancel or lessen the flexure stiffness. $I_i$, $I_s$ are inertia about the i-axis and s-axis, respectively.

Figure 2A:
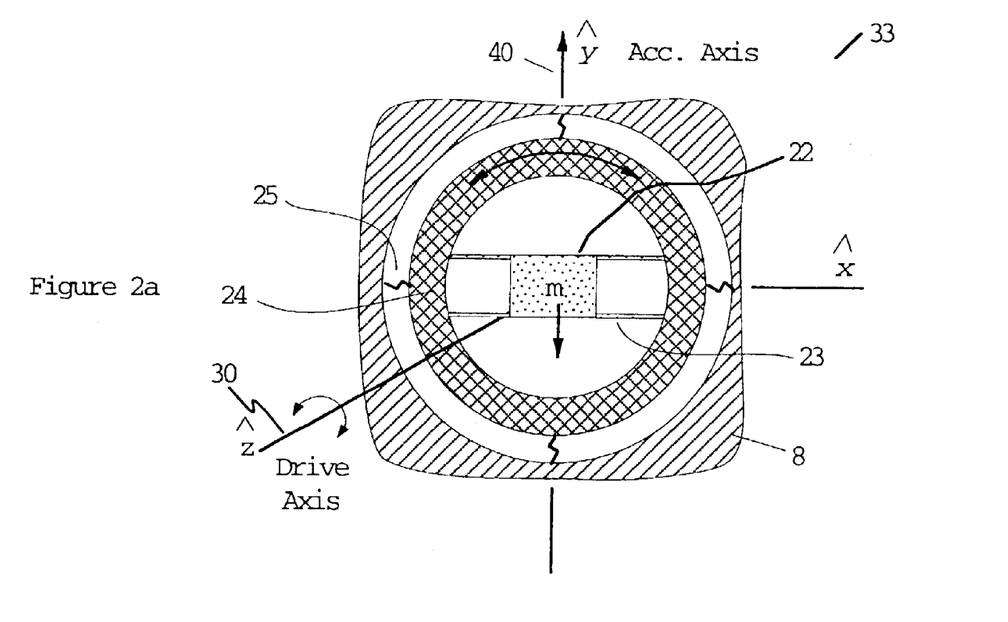
FIG. 2a depicts an embodiment of a planar tuned flexure mass accelerometer (linear) with a drive member that is oscillated about the axis normal to the plane and a responsive member that senses acceleration along an axis in the plane.

In FIG. 2a is shown a TFA accelerometer 33 based on an oscillating Outer Member. This accelerometer is referred to as a Mass Tuned Flexure Accelerometer. It comprises the reference mass 22 attached with a series of parallel flexures 23 (four are shown) to the Outer Member 24. The flexures allow motion along the Acceleration Axis 40 and are stiff to other motions. The Outer Member is attached with radial flexures 25 (four are shown) to the Case 8. To operate, the Outer Member is oscillated sinusoidally about the Drive Axis 30. The reference mass responds to acceleration in the same manner as a simple mass accelerometer by displacing relative to the case along the Acceleration Axis 40 but with an effectively reduced restraint. This accelerometer is appropriate for the IMU of this invention based on a common drive member that oscillates about the axis normal to the plane.

Figure 2B:
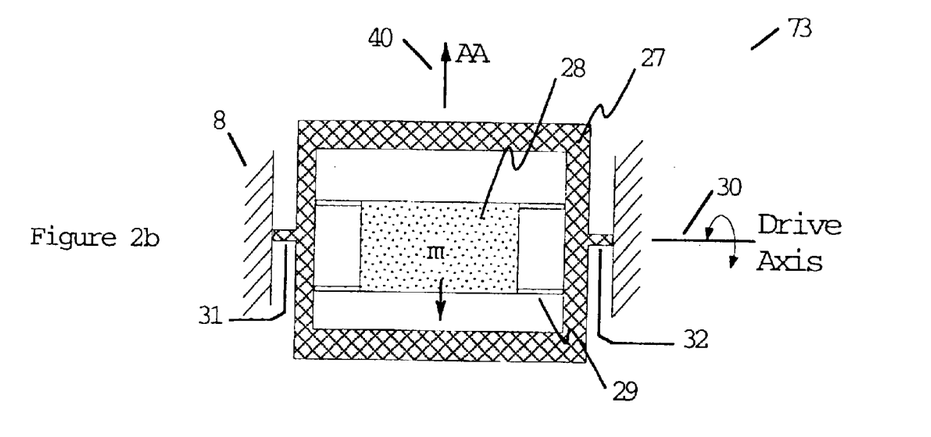
FIG. 2b depicts an embodiment of a planar tuned flexure mass accelerometer with a drive member that is oscillated about an axis in the plane and a responsive member that senses acceleration along an axis in the plane.

In FIG. 2b is shown a second TFA mass accelerometer 73 based on an oscillating Outer Member 27 but with an axis of oscillation that is about a Drive Axis 30 in the plane. It comprises the reference mass 28 attached with a series of parallel flexures 29 (four are shown) to the Outer Member. The flexures allow motion along the Acceleration Axis (AA) 40 and are stiff to other motions. The Outer Member is attached with torsional flexures 31, 32 to the Case 8. To operate, the Outer Member is oscillated sinusoidally about the Drive Axis 30. The reference mass responds to acceleration in the same manner as simple mass accelerometers by displacing relative to the case along the Acceleration Axis but with an effectively reduced restraint. This accelerometer is appropriate for the IMU of this invention based on a common drive member that oscillates about an axis in the plane.

Figure 2C:
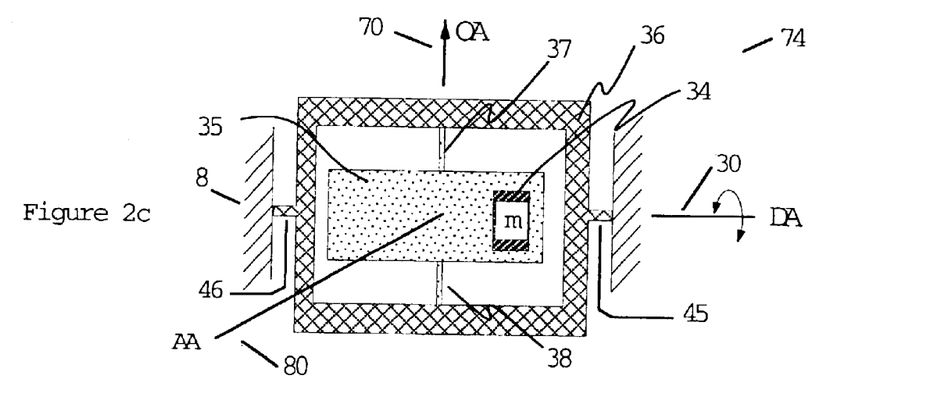
FIG. 2c depicts an embodiment of a pendulous tuned flexure planar accelerometer with a drive member that is oscillated about an axis in the plane and a responsive member that senses acceleration along an axis that is normal to the plane.

In FIG. 2c is shown a pendulous TFA accelerometer 74 based on an oscillating Outer Member 36 with an axis of oscillation that is about Drive Axis 30 in the plane. It is based on a pendulum to sense acceleration along an axis normal to the plane. The pendulum is formed by adding a reference mass 34 to the Inner Member 35. The Inner Member is attached to the Outer Member by torsional flexures 37, 38 that allow the pendulum to rotate about the Output Axis 70. The Outer Member is attached to the Case 8 by torsional flexures 45, 46. To operate, the Outer Member is oscillated sinusoidally about the Drive Axis 30. The pendulum responds to acceleration in the same manner as simple pendulous accelerometers by rotating about the Output Axis but with an effectively reduced restraint. This accelerometer is appropriate for the IMU of this invention based on a common drive member that oscillates about an axis in the plane.

Figure 2D:
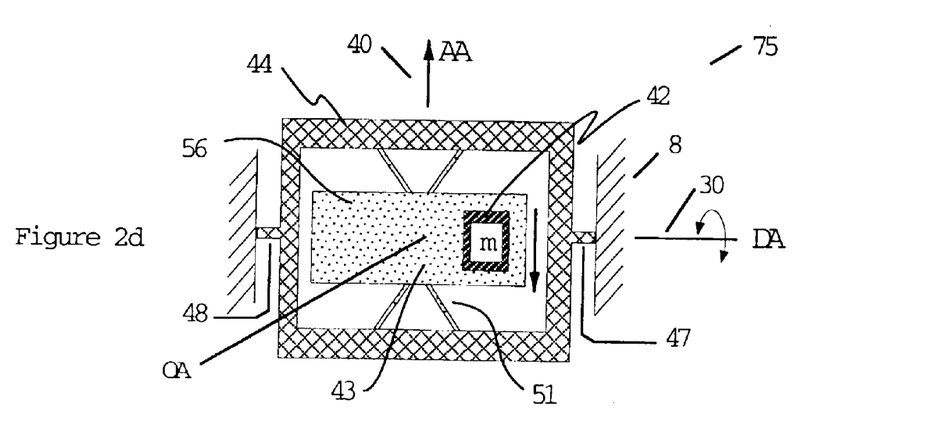
FIG. 2d depicts an embodiment of a pendulous tuned flexure planar accelerometer with a drive member that is oscillated about an axis in the plane and a responsive member that senses acceleration along an axis in the plane.

In FIG. 2d is shown a second pendulous TFA accelerometer 75 based on an oscillating Outer Member 44 with an axis of oscillation that is about Drive Axis 30 in the plane. It is based on a pendulum to sense acceleration along an axis in the plane. The pendulum is formed by adding a reference mass 42 to the Inner Member 43. The Inner Member is attached to the Outer Member by flexures 51 that allow the pendulum to rotate about the Output Axis normal to the plane. The Outer Member is attached to the Case 8 by torsional flexures 47, 48. To operate, the Outer Member is oscillated sinusoidally about the Drive Axis 30. The pendulum responds to acceleration in the same manner as simple pendulous accelerometers by rotating about the Output Axis but with an effectively reduced restraint. This accelerometer is appropriate for the IMU of this invention based on a common drive member that oscillates about an axis in the plane.

Candidate Non-Tuned Accelerometers

Simple accelerometers can certainly be used in Integrated IMUs. In this invention IMUs are based on an oscillatory common member. Therefore the simple accelerometers will be subject to oscillations. If properly oriented, they will be insensitive to the motion and work normally. However, they can also be oriented to include the oscillatory motion as part of the acceleration input, and the high frequency signal can be used to calibrate the sensitivity of the accelerometer if the reference mass or pendulum is not damped.

Figure 3A:
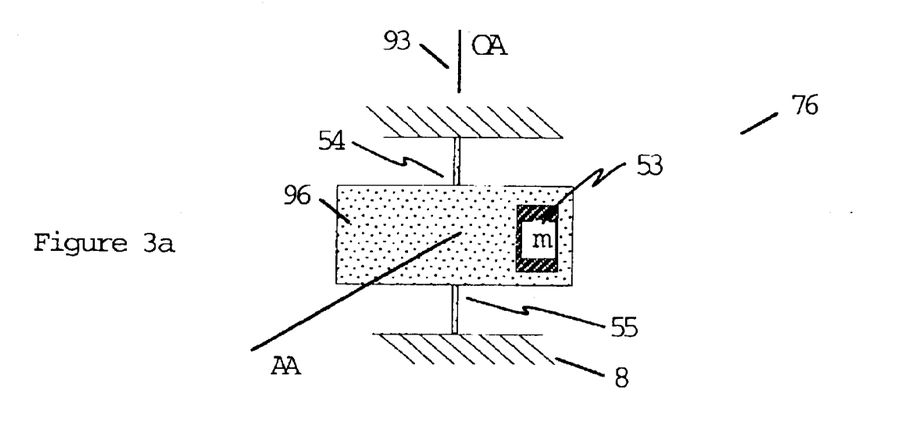
FIG. 3a depicts an embodiment of a simple pendulous planar accelerometer that senses acceleration along an axis normal to the plane.

In FIG. 3a is shown a simple pendulum accelerometer 76 for sensing acceleration along an axis normal to the plane. A reference mass 53 is added to the single movable member 96 to form the pendulum. The pendulum is attached with flexures 54, 55 to the case 8. The flexures allow rotation of the pendulum about the Output Axis 93 in response to input.

Figure 3B:
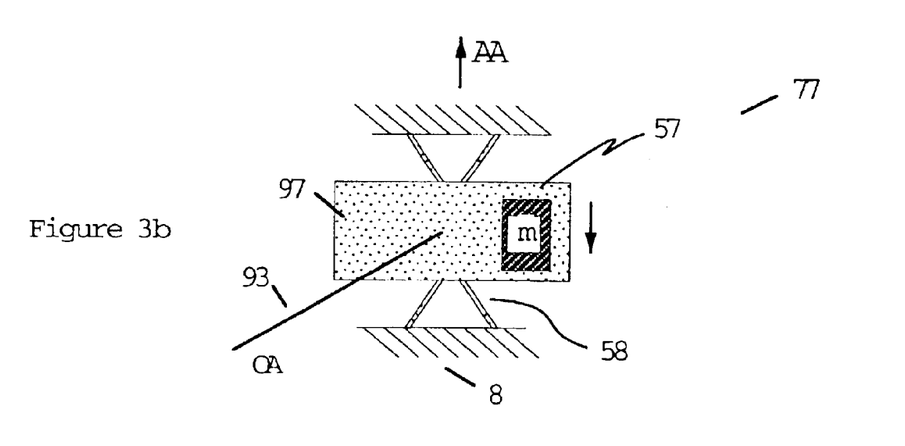
FIG. 3b depicts an embodiment of a simple pendulous planar accelerometer that senses acceleration along an axis in the plane.

In FIG. 3b is shown a second simple pendulum accelerometer 77 for sensing acceleration along an axis in the plane. A reference mass 57 is added to the single movable member 97 to form the pendulum. The pendulum is attached with flexures 58 to the case 8. The flexures allow rotation of the pendulum about the Output Axis 93 (normal to the plane) in response to input.

Figure 3C:
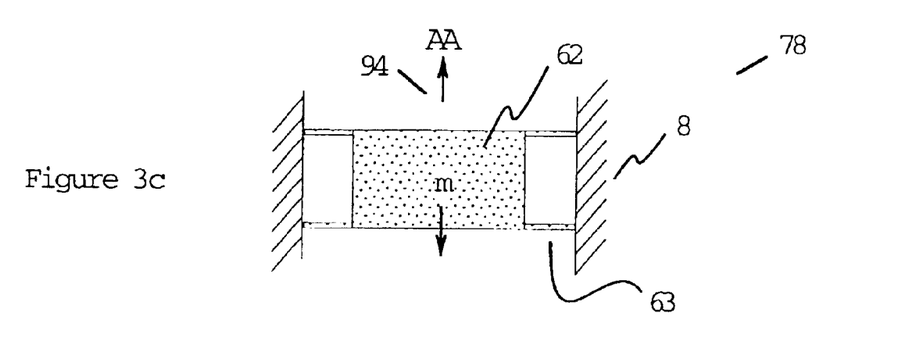
FIG. 3c depicts an embodiment of a planar mass accelerometer (linear) that senses acceleration along an axis in the plane.

In FIG. 3c is shown a simple mass accelerometer 78 for sensing acceleration along an axis in the plane with reference mass 62. The mass is attached with flexures 63 to the case 8. The flexures allow translation of the mass along the Output Axis 94 in response to input.

MEMS-Integrated IMU

For each embodiment, the gyroscopes and accelerometers with a common Outer Member are candidate instruments for the Integrated IMU with the Common Substrate. Typically, an Integrated IMU can be accomplished by the fabrication of the planar designs on a single chip. In these embodiments, however, the intent is to provide a common substrate to eliminate instrument Outer Members. The IMU embodiment becomes the attachment of the Inner Members of each instrument to the Case, which in the following embodiments is part of, or mounted to, the common substrate. In the following embodiments the Inner Members are shown attached by the case to the common substrate.

IMU configurations are based on two motions of the common substrate: about an axis normal to the surface and about an axis in the plane.

The common substrate essentially serves as the "stable member" used in conventional IMUs. It can be made of a different thickness than the instruments and can be engineered with stability in mind.

Some advantages of the common substrate include:

drive and control of one drive member, overall size reduction, the common substrate can be made of a thickness that is different from the inner member structure thickness allowing for a higher oscillation frequency than could be achieved by any instrument alone, the common member can be actuated by other than capacitive means.

Configuration 1—In-Plane Oscillation

Configuration a

Figure 4:
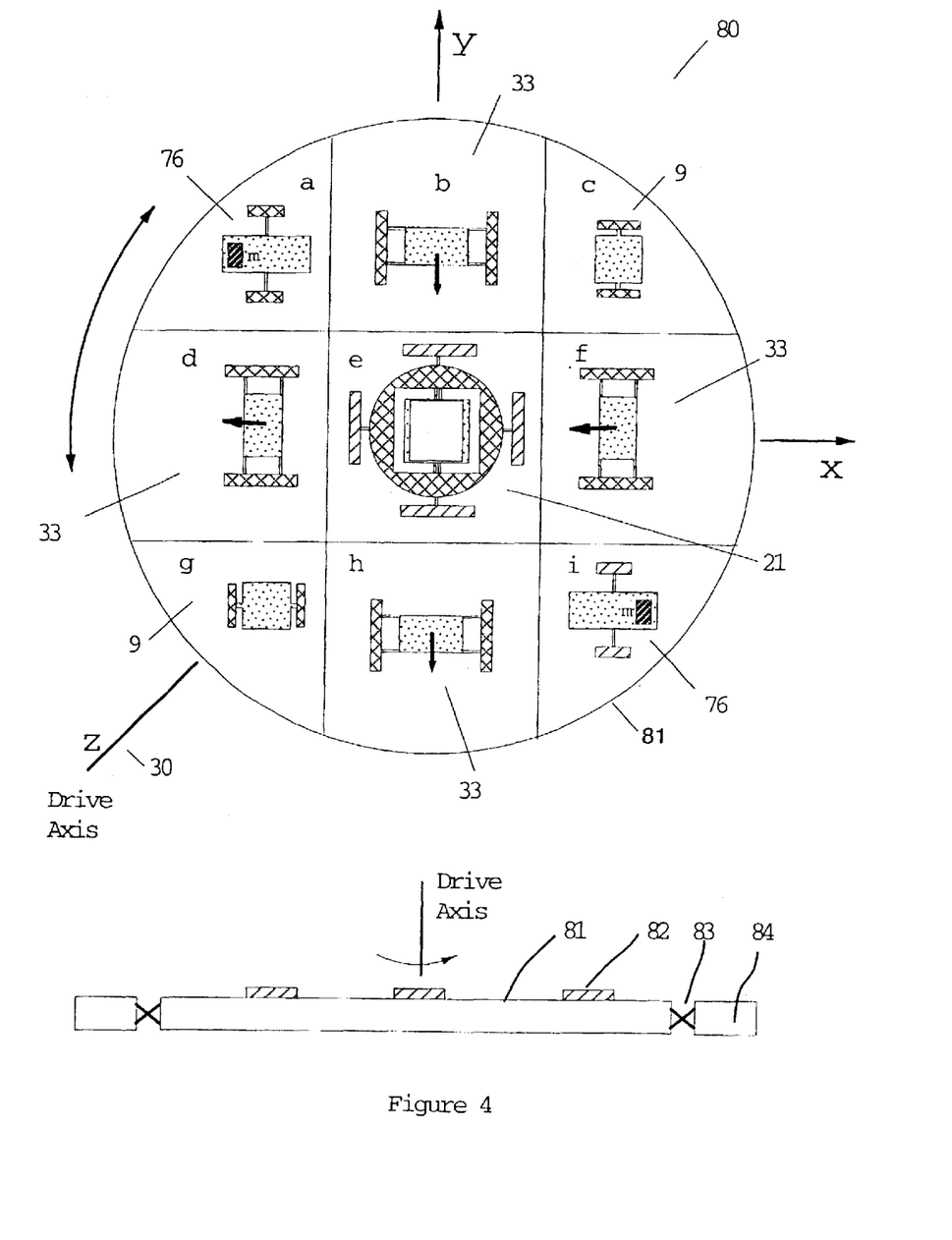
FIG. 4 is a conceptual rendition of a first Integrated IMU with a common drive member that is oscillated about the axis normal to the plane.

The first IMU 80 of Configuration 1 is illustrated in FIG. 4. It shows a common substrate 81 in the shape of a flat circular disk onto which are located nine instruments in a 3 by 3 cellular matrix arrangement. The disk is mechanically oscillated about the axis normal to the plane, the z-axis. The cells are labelled by letters (a) to (i). Although three gyros and three accelerometers are sufficient to measure motion in six degrees of freedom, in this case, three additional instruments are added to improve the performance of the IMU. This IMU describes one particular arrangement of instruments. Others are possible. The instrument in each cell is identified by the number allocated to candidate gyros and accelerometers in FIGS. 1 to 3:

Cells a and i: Simple pendulum accelerometers 76 sense along the z-axis.

Cells b and h: Mass TFAs 33 sense acceleration along the y-axis.

Cell c: Gyro 9 senses rotation rate about the x-axis.

Cells d and f: Mass TFAs 33 sense acceleration along the x-axis.

Cell e: DETF Gyro 21 senses rotation rate about the z-axis.

Cell g: Gyro 9 (rotated) senses rotation rate about the y-axis.

Accelerometers 33 in cells (b) and (h) are aligned with the output axis (y-axis) with the center of mass of the reference masses at the same radial distance from the center of rotation of the common substrate. The accelerometers should have low sensitivity to angular acceleration since the flexures are parallel to the tangent of the disk. The accelerometers are sensitive to acceleration along the y-axis as well as to rotation rate about the z-axis due to centrifugal forces. By summing and differencing their signals, acceleration can be separated from rotation rate since rotation rate forces each reference mass to translate radially outwards relative to the substrate whereas acceleration forces the masses to translate in the same direction. The rotation rate signal can be used as a separate measure of rotation rate about the z-axis. The same is true for accelerometers 33 in cells (d) and (f) except that they are aligned with the x-axis.

The z-axis gyro 21 contains both moving members and does not benefit similarly from the common substrate motion. The oscillatory motion, however, can be used to monitor the gyro sensitivity since it is gyro input.

To operate the IMU, the common substrate is oscillated sinusoidally at constant amplitude at its resonant frequency. Resonant operation minimizes the power requirement. The amplitude of oscillation is kept constant to maintain gyro and accelerometer sensitivities constant. To optimize gyro sensitivity, the resonance of the inner member is made to closely match the drive frequency. Under rotation rate, the inner member of each x, y gyro responds by oscillating at the same frequency, the frequency of the common member, each at an amplitude proportional to rotation rates about the x and y axes respectively. Under acceleration, the inner member of the pendulous designs rotates about the flexure axis and the inner member of the reference mass designs translates along the acceleration axis. The inner member of each gyro and accelerometer operates independently of the others.

The cross-section illustrates further the common substrate 81 and the oscillatory motion as allowed by flexures 83. The instruments 92 are shown placed on the substrate. The stationary part 84 of the substrate is attached to the package.

Configuration b

Figure 5:
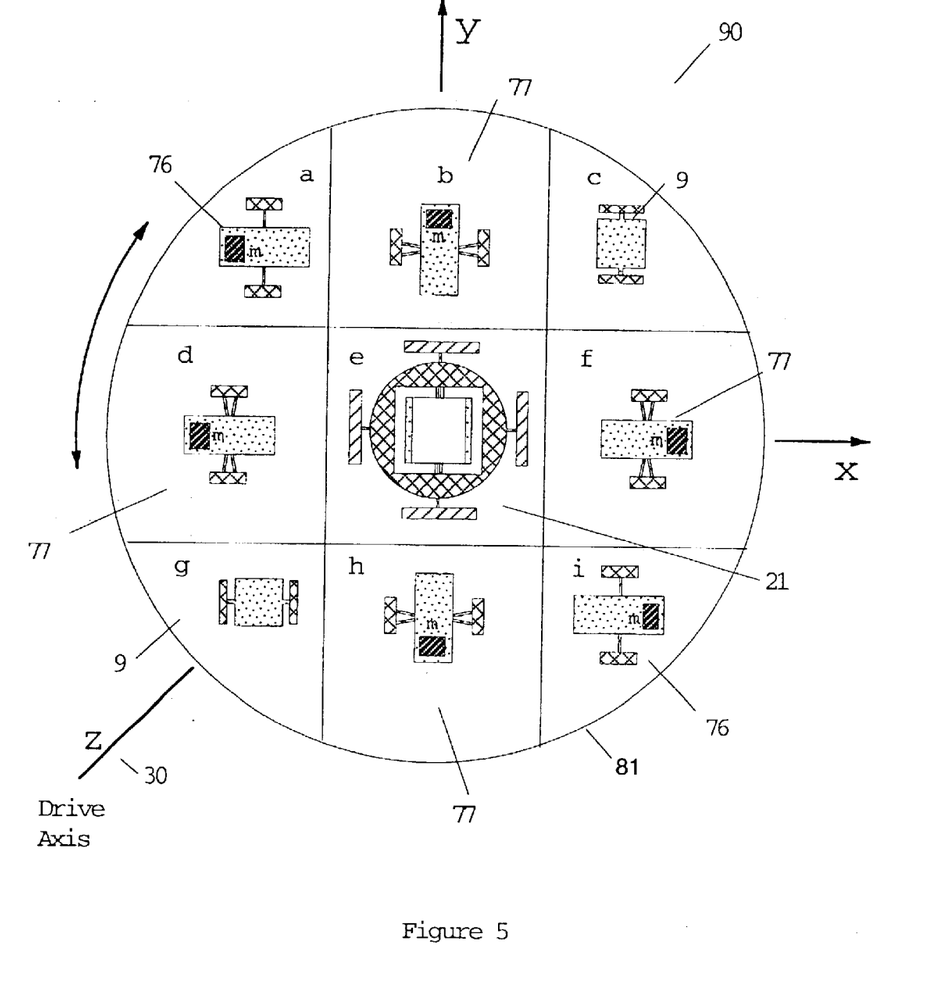
FIG. 5 is a conceptual rendition of a second Integrated IMU with a common drive member that is oscillated about the axis normal to the plane.

The second IMU 90 of Configuration 1 is illustrated in FIG. 5. It describes a different arrangement of instruments as listed:

Cells a and i: Simple pendulum accelerometers 76 sense along the z-axis.

Cells b and h: Simple pendulum accelerometers 77 sense acceleration along the x-axis. Note the position of the reference mass, m.

Cell c: Gyro 9 senses rotation rate about the x-axis.

Cells d and f: Simple pendulum accelerometers 77 sense acceleration along the y-axis.

Cell e: DETF Gyro 21 senses rotation rate about the z-axis.

Cell g: Gyro 9 (rotated) senses rotation rate about the y-axis.

Accelerometers 77 in cells (b) and (h) are aligned with the flexure axis parallel to the x-axis with the center of mass of the reference masses at the same radial distance from the center of rotation of the common substrate. The accelerometers should have low sensitivity to centrifugal (radial) acceleration since the flexures are made stiff to radial translation. The accelerometers are sensitive to rotation rate input about the z-axis as well as acceleration along the y-axis since they are subject to angular acceleration. By summing and differencing their signals, acceleration can be separated from rotation rate since rotation rate forces each reference mass to rotate in the same sense whereas acceleration forces the masses to rotate in opposite senses. The rotation rate signal can be used as a separate measure of rotation rate about the z-axis. The same is true for accelerometers 77 in cells (d) and (f) except that they are aligned with their flexures parallel to the y-axis.

The z-axis gyro 21 contains both moving members and does not benefit similarly from the common substrate motion. The oscillatory motion, however, can be used to monitor the gyro sensitivity since it is gyro input.

To operate the IMU, the common substrate is oscillated sinusoidally at constant amplitude at its resonant frequency. Resonant operation minimizes the power requirement. The amplitude of oscillation is kept constant to maintain gyro and accelerometer sensitivities constant. To optimize gyro sensitivity, the resonance of the inner member is made to closely match the drive frequency. Under rotation rate, the inner member of each x, y gyro responds by oscillating at the same frequency, the frequency of the common member, each at an amplitude proportional to rotation rates about the x and y axes, respectively. Under acceleration, the inner member rotates about the flexure axis. The inner member of each gyroscope and accelerometer operates independently of the others.

Alternative Construction for the IMU With a Common Drive

Figure 6:
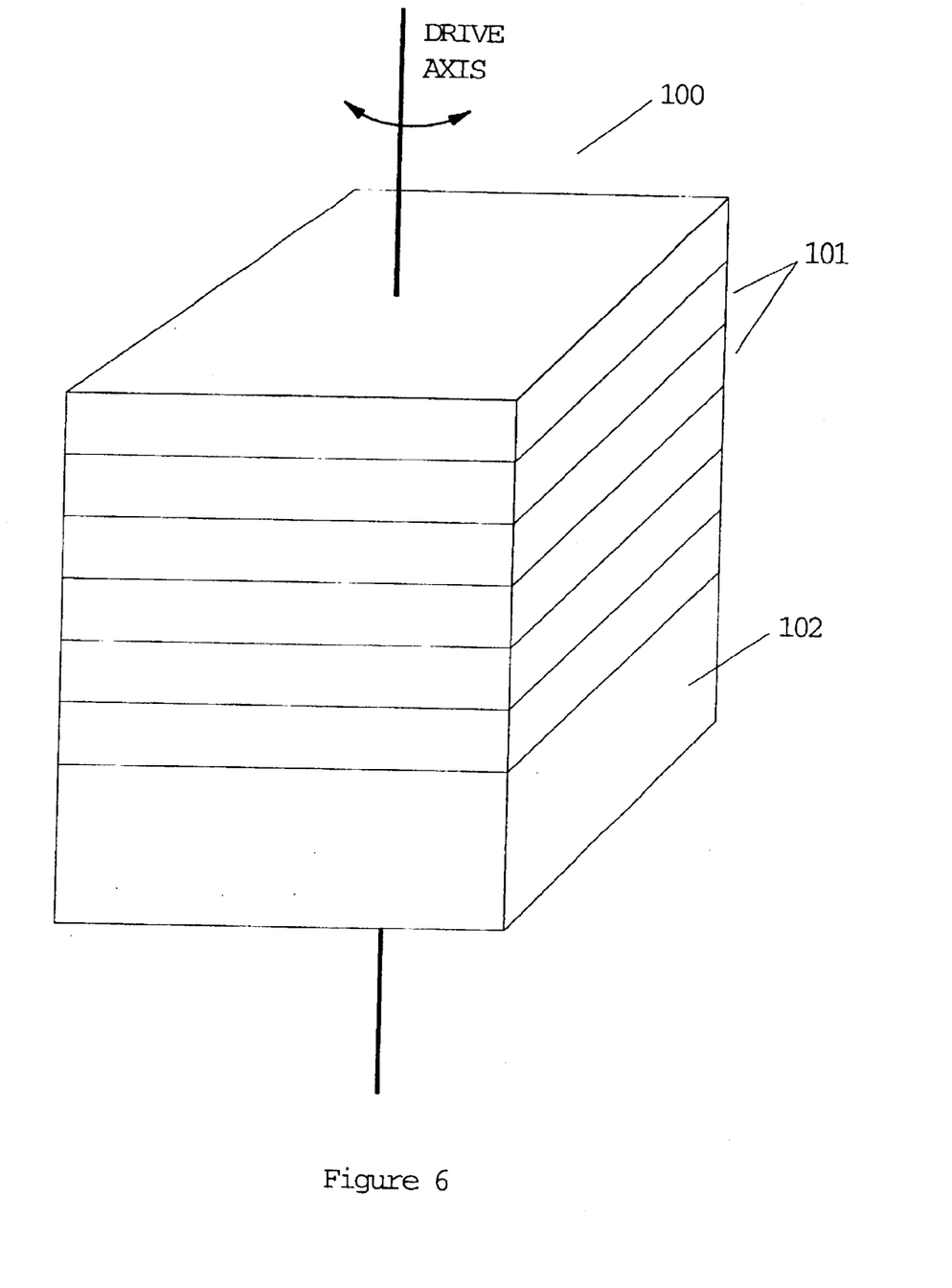
FIG. 6 illustrates the formation of an IMU by the stacking of separate instrument chips that can be driven by a common member that is oscillated about the axis normal to the plane.

FIG. 6 illustrates an alternate IMU concept 100 comprising six instrument layers 101 that contain primarily the inner responsive members of three gyros and three accelerometers, each coupled to a case. The layers are stacked through their cases and aligned. The stack is then coupled to and driven by a common drive member (gimbal) 102.

Configuration 2—Out-of-Plane Oscillation
Configuration a

Figure 7:
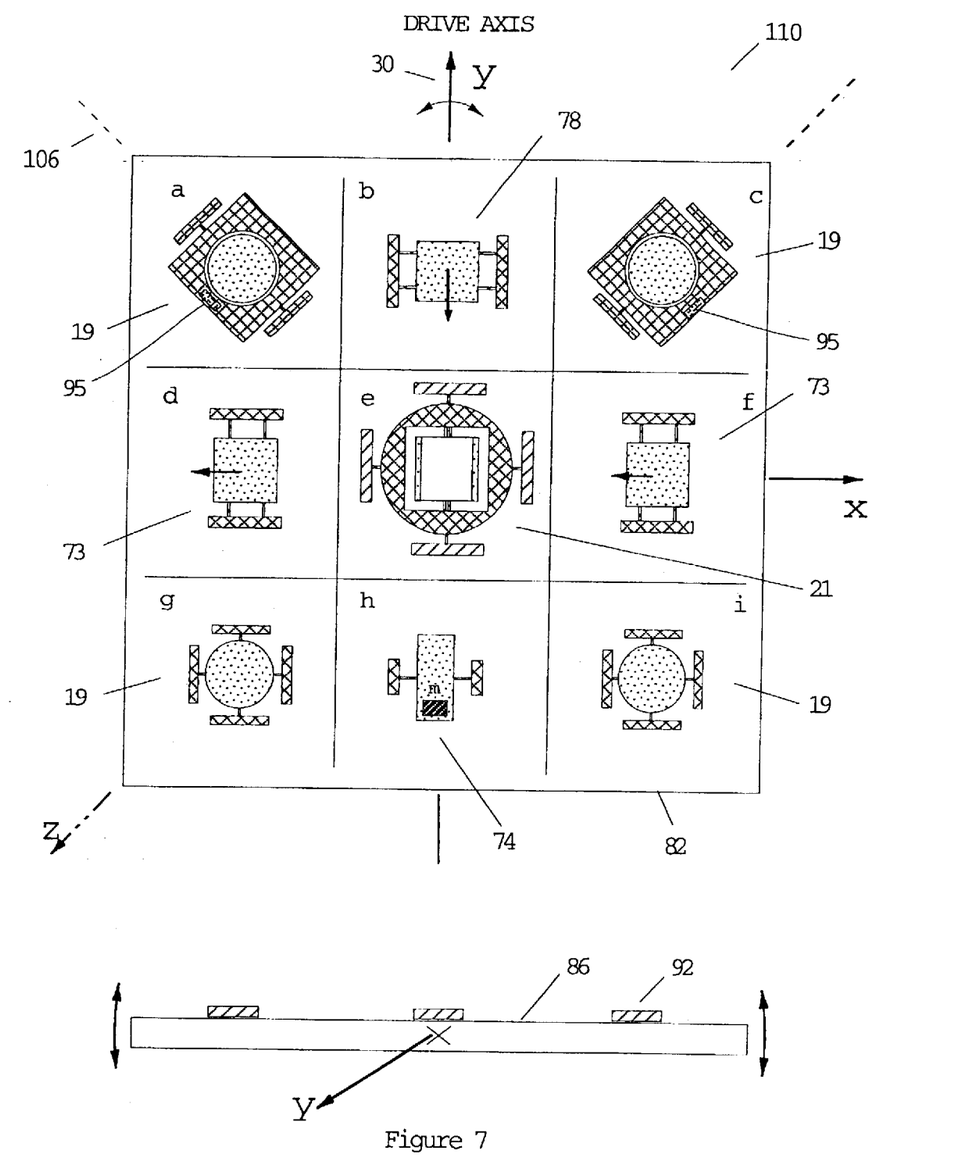
FIG. 7 is a conceptual rendition of a first Integrated IMU with a common drive member that is oscillated about an axis in the plane.

The first IMU 110 of Configuration 2 is illustrated in FIG. 7. It shows a common substrate 86 in the shape of a flat plate onto which are located nine instruments in a 3 by 3 cellular matrix arrangement. The plate is oscillated about the Drive Axis 30, an axis in the plane. The cells are labelled by letters (a) to (i). Although three gyros and three accelerometers are sufficient to measure motion in six degrees of freedom, in this case three additional instruments are added to improve the performance of the IMU. This IMU describes one particular arrangement of instruments. Others are possible.

Unlike the Configuration 1 IMU, Configuration 2 cannot provide a common oscillation axis for the gyros since the x and y gyros need to be driven about orthogonal axes. The approach to circumvent this difficulty is to mount two gyros 19 aligned with Outer Member flexures at +/−45 degrees 106 to the oscillation axis. On the Outer Member is located a mass 95 that provides an unbalance which couples the gyros to oscillate with the common substrate motion. This gyro has a combined rotation rate sensitivity about the x-axis and y-axis. By using the rotation rate from the gyros in cells (g) and (i) that sense the rate about the x-axis, the rotation rate about the y-axis can be calculated. Alternatively, by combining the signals from two gyros 19 aligned as shown, it is possible to separate the rotation rates about the x-axis and y-axis because both gyros measure rotation rates about the same y-axis whereas both measure counter-rotations about the x-axis.

The instrument in each cell is identified by the number allocated to candidate gyros and accelerometers in FIGS. 1 to 3:

Cell a and c: Gyros 19 with mass unbalance to drive the Outer Member sense combined rotation rates about the x-axis and y-axis.

Cell b: Simple mass accelerometer 78 senses acceleration along the y-axis.

Cells d and f: TFA mass accelerometers 73 sense acceleration along the x-axis.

Cell e: DETF Gyro 21 senses rotation rate about the z-axis.

Cells g and i: Gyros 19 sense rotation rate about the x-axis.

Cell h: TFA accelerometer 74 senses acceleration along the z-axis.

TFA mass accelerometers 73 in cells (d) and (f) are located at the same distance from the center of oscillation so that they have the same sensitivity. The benefit of the distance at which the instrument is placed is to increase tuning capacity hence provide greater sensitivity. The accelerometers are also sensitive to rotation rate about the z-axis due to the centrifugal forces. By the proper summing and differencing of signals, acceleration can be separated from the rotation rate.

The cross-section illustrates further the common substrate 86 and the oscillatory motion. The instruments 92 are shown placed on the substrate.

To operate the IMU, the common substrate is oscillated sinusoidally at constant amplitude at its resonant frequency. Resonant operation minimizes the power requirement. The amplitude of oscillation is kept constant to maintain gyro and accelerometer sensitivities constant. To optimize gyro sensitivity, the resonance of the inner member is made to closely match the drive frequency. Under rotation rate, the inner member of each x, y gyro responds by oscillating at the same frequency, the frequency of the common member, each at an amplitude proportional to rotation rates about the x and y axes respectively. Under acceleration, the inner member of the pendulous designs rotates about the flexure axis and the inner member of the reference mass designs translates along the acceleration axis. The inner member of each gyro and accelerometer operates independently of the others.

Configuration b

Figure 8:
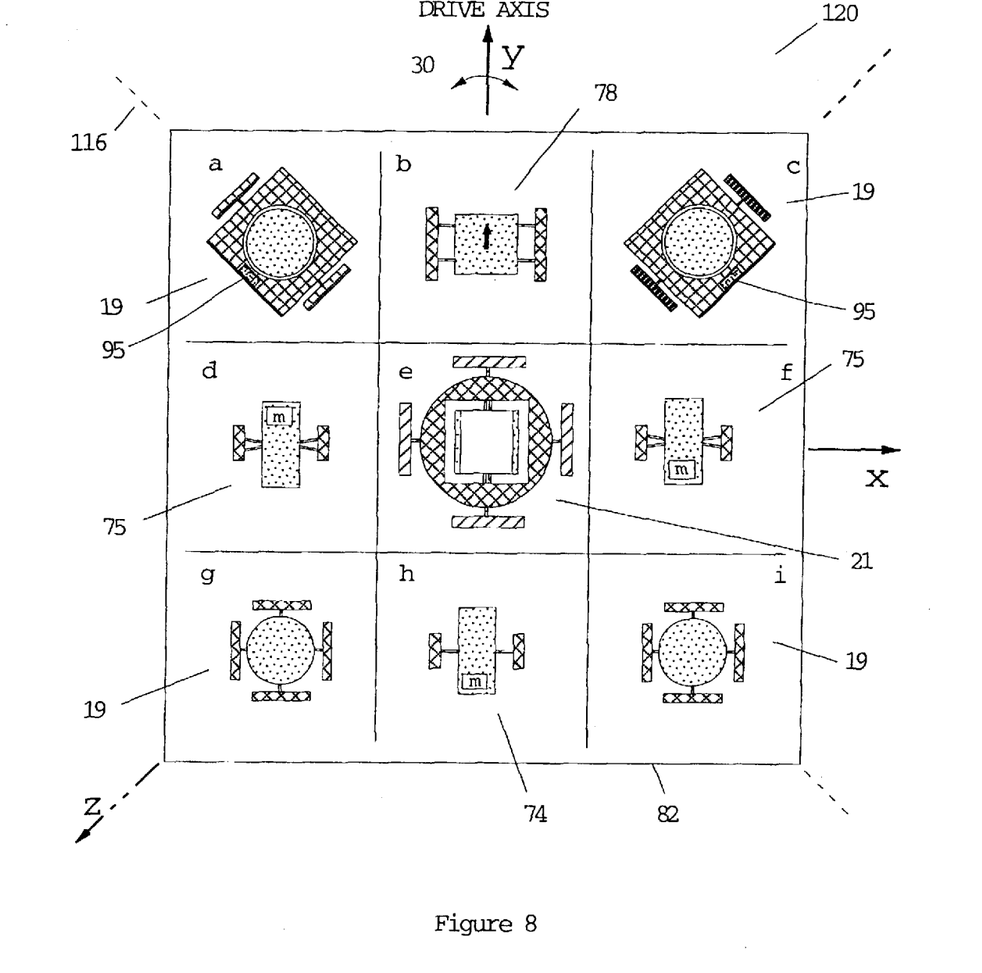
FIG. 8 is a conceptual rendition of a second Integrated IMU with a common drive member that is oscillated about an axis in the plane.

The second IMU 120 of Configuration 2 is illustrated in FIG. 8. It shows a common substrate 82 in the shape of a flat plate onto which are located nine instruments in a 3 by 3 cellular matrix arrangement. This IMU represents a different arrangement of instruments.

The instrument in each cell is identified by the number allocated to candidate gyros and accelerometers in FIGS. 1 to 3:

Cells a and c: Gyros 19 with mass unbalance to drive the Outer Member sense combined rotation rates about the x-axis and y-axis.

Cell b: Simple mass accelerometer 78 senses acceleration along the y-axis.

Cells d and f: Pendulum TFA accelerometers 75 sense acceleration along the x-axis.

Cell e: DETF Gyro 21 senses rotation rate about the z-axis.

Cells g and i: Gyros 19 sense rotation rate about the x-axis.

Cell h: TFA accelerometer 74 senses acceleration along the z-axis.

Pendulum TFA accelerometers 75 in cells (d) and (f) are located at the same distance from the center of oscillation so that they have the same sensitivity. The benefit of the distance at which the accelerometer is placed is to increase tuning capacity hence provide greater sensitivity. The accelerometers are also sensitive to rotation rate about the z-axis through centrifugal acceleration sensitivity. By the proper summing and differencing of signals, acceleration can be separated from the rotation rate.

To operate the IMU, the common substrate is oscillated sinusoidally at constant amplitude at its resonant frequency. Resonant operation minimizes the power requirement. The amplitude of oscillation is kept constant to maintain constant gyro and accelerometer sensitivities. To optimize gyro sensitivity, the resonance of the inner member is made to closely match the drive frequency. Under rotation rate, the inner member of each x, y gyro responds by oscillating at the same frequency, the frequency of the common member, each at an amplitude proportional to rotation rates about the x and y axes respectively. Under acceleration, the inner member of the pendulous designs rotates about the flexure axis and the inner member of the reference mass designs translates along the acceleration axis. The inner member of each gyroscope and accelerometer operates independently of the others.

Other embodiments will occur to those skilled in the art and are within the following claims.

What is claimed is:

1. A planar, integrated inertial measurement unit (IMU) based on a common substrate acting as a gimbal, the IMU including at least two coplanar inertial measurement instruments, the IMU comprising:
   a common planar gimbal; and
   a responsive member for each instrument, each responsive member coupled to the gimbal by flexures;
   wherein the gimbal is driven in oscillation to provide a common drive motion to all of the instruments.

2. The planar IMU of claim 1 comprising a six degree of freedom (DOF) IMU.

3. The planar IMU of claim 2 comprising at least three gyroscopes and at least three accelerometers, all inertial measurement instruments being coplanar.

4. The planar IMU of claim 3 wherein there are at least four accelerometers.

5. The planar IMU of claim 4 wherein two of the accelerometers are arranged to sense accelerations along a first axis.

6. The planar IMU of claim 5 wherein two different accelerometers are arranged to sense accelerations along a second axis orthogonal to the first axis.

7. The planar IMU of claim 6 further comprising two additional accelerometers arranged to sense accelerations along a third axis that is orthogonal to the first and second axes.

8. The planar IMU of claim 5 in which the two accelerometers are tuned flexure accelerometers.

9. The planar IMU of claim 6 in which the two different accelerometers are tuned flexure accelerometers.

10. The planar IMU of claim 3 wherein one of the gyroscopes senses rotation rates about an axis in the plane and another gyroscope senses rotation rates about an orthogonal axis also in the plane.

11. The planar IMU of claim 10 wherein a third gyroscope senses rotation rate about a third orthogonal axis normal to the plane.

12. The planar IMU of claim 4 comprising two accelerometers that are sensitive to angular accelerations.

13. The planar IMU of claim 12 comprising four accelerometers that are sensitive to angular accelerations, to allow accelerations along two orthogonal axes in the plane to be determined, and to allow angular accelerations to be determined.

14. The planar IMU of claim 1 wherein the common planar gimbal is driven to oscillate about an axis that lies in the plane.

15. The planar IMU of claim 14 comprising two gyroscopes that sense rotation rate about a first axis in the plane.

16. The planar IMU of claim 15 further comprising two other gyroscopes that each further comprise a pendulous gimbal that is driven by the common gimbal, in which the pendulous gimbals move about orthogonal axes that lie in the plane and that are transverse to the gimbal oscillation axis, wherein such two other gyroscopes together sense rotation rates about a second axis in the plane that is orthogonal to the first axis.

17. The planar IMU of claim 16 comprising two accelerometers that each sense acceleration along one axis in the plane.

18. The planar IMU of claim 17 further comprising two additional accelerometers, one that senses acceleration along an axis orthogonal to the plane and to the one axis, and another that senses acceleration along a second axis in the plane and orthogonal to the one axis.

19. The planar IMU of claim 16 comprising one accelerometer that senses acceleration along one axis in the plane, and another accelerometer that senses acceleration along an axis orthogonal to the plane.

20. The planar IMU of claim 19 further comprising two additional accelerometers, each of which are sensitive to centrifugal accelerations.

21. The planar IMU of claim 1 wherein the common planar gimbal is driven to oscillate about an axis that is orthogonal to the plane.

22. An integrated inertial measurement unit (IMU) comprising:
    a common gimbal; and
    a plurality of stacked inertial measurement instruments, each instrument comprising a responsive member coupled by flexures to a case;
    wherein the common gimbal is driven in oscillation to provide a common drive motion to all of the instruments.

* * * * *